(12) United States Patent
He et al.

(10) Patent No.: US 7,856,619 B2
(45) Date of Patent: Dec. 21, 2010

(54) METHOD AND SYSTEM FOR AUTOMATED TESTING OF A GRAPHIC-BASED PROGRAMMING TOOL

(75) Inventors: Yu He, Shanghai (CN); Penina Weiss, Givat Shemuel (IL)

(73) Assignee: SAP AG, Walldorf (DE)

( * ) Notice: Subject to any disclaimer, the term of this patent is extended or adjusted under 35 U.S.C. 154(b) by 1248 days.

(21) Appl. No.: 11/393,941

(22) Filed: Mar. 31, 2006

(65) Prior Publication Data
US 2007/0234121 A1  Oct. 4, 2007

(51) Int. Cl.
G06F 9/44 (2006.01)
G06F 3/048 (2006.01)

(52) U.S. Cl. .................. 717/109; 717/107; 717/125; 715/763

(58) Field of Classification Search .......... 717/125
See application file for complete search history.

(56) References Cited

U.S. PATENT DOCUMENTS

| | | | | |
|---|---|---|---|---|
| 5,600,789 A * | 2/1997 | Parker et al. | | 714/38 |
| 5,781,720 A * | 7/1998 | Parker et al. | | 714/38 |
| 6,332,211 B1 * | 12/2001 | Pavela | | 717/130 |
| 6,421,822 B1 * | 7/2002 | Pavela | | 717/125 |
| 6,772,083 B2 * | 8/2004 | Muller et al. | | 702/123 |
| 6,934,934 B1 * | 8/2005 | Osborne et al. | | 717/126 |
| 6,961,873 B2 * | 11/2005 | Dubovsky | | 714/38 |
| 6,978,440 B1 * | 12/2005 | Pavela | | 717/125 |
| 6,993,747 B1 * | 1/2006 | Friedman | | 717/124 |
| 7,039,899 B1 * | 5/2006 | Quiroga | | 717/115 |
| 7,058,857 B2 * | 6/2006 | Dallin | | 714/38 |
| 7,124,401 B2 * | 10/2006 | Muller et al. | | 717/124 |
| 7,174,541 B2 * | 2/2007 | Muller et al. | | 717/124 |
| 7,272,822 B1 * | 9/2007 | Riggins et al. | | 717/124 |
| 7,305,659 B2 * | 12/2007 | Muller et al. | | 717/127 |
| 7,490,319 B2 * | 2/2009 | Blackwell et al. | | 717/124 |
| 7,526,498 B2 * | 4/2009 | Dubovsky | | 1/1 |

(Continued)

FOREIGN PATENT DOCUMENTS

CN  1503168 A  6/2004

(Continued)

OTHER PUBLICATIONS

Yanhong Sun, "Specification-Driven Automated Testing of GUI-Based Java Programs", Apr. 2-3, 2004, Retrieved from <http://delivery.acm.org/10.1145/990000/986570/p140-sun.pdf?key1=986570&key2=3989612821&coll=GUIDE&dl=GUIDE&CFID=101057864&CFTOKEN=74557152>, Total pp. 6.*

*Primary Examiner*—Tuan Q Dam
*Assistant Examiner*—Marina Lee
(74) *Attorney, Agent, or Firm*—Kenyon & Kenyon LLP

(57) ABSTRACT

A method and a system for automated testing of a graphic-based programming tool. The present invention includes a computer-implemented method that allows a developer to easily generate scripts for automatically testing a graphic-based programming tool using generic reusable building blocks of test code and separate decoupled parameter data. The method further allows the developer to automatically test and re-test a graphic-based programming tool using the generated scripts. The system provides a memory and a processor for implementing the automated testing methods according to embodiments of the present invention. An example application is a graphic-based programming tool used to generate screens and their underlying program logic.

20 Claims, 7 Drawing Sheets

U.S. PATENT DOCUMENTS

| | | | |
|---|---|---|---|
| 2002/0087952 A1* | 7/2002 | Tabe et al. | 717/124 |
| 2003/0005413 A1* | 1/2003 | Beer et al. | 717/125 |
| 2003/0052917 A1* | 3/2003 | Dubovsky | 345/764 |
| 2003/0055836 A1 | 3/2003 | Dubovsky | |
| 2003/0056150 A1* | 3/2003 | Dubovsky | 714/38 |
| 2003/0070119 A1* | 4/2003 | Dallin | 714/38 |
| 2004/0003325 A1* | 1/2004 | Muller et al. | 714/38 |
| 2004/0041827 A1* | 3/2004 | Bischof et al. | 345/704 |
| 2004/0044992 A1* | 3/2004 | Muller et al. | 717/124 |
| 2004/0044993 A1* | 3/2004 | Muller et al. | 717/124 |
| 2004/0143819 A1* | 7/2004 | Cheng et al. | 717/125 |
| 2004/0194065 A1* | 9/2004 | McGrath et al. | 717/124 |
| 2004/0199818 A1* | 10/2004 | Boilen et al. | 714/25 |
| 2005/0257198 A1* | 11/2005 | Stienhans et al. | 717/124 |
| 2005/0268285 A1* | 12/2005 | Bagley et al. | 717/124 |
| 2006/0101404 A1* | 5/2006 | Popp et al. | 717/124 |
| 2007/0022406 A1* | 1/2007 | Liu | 717/124 |
| 2008/0301628 A1* | 12/2008 | Lochmann | 717/107 |
| 2009/0089688 A1* | 4/2009 | Zhao | 715/762 |

FOREIGN PATENT DOCUMENTS

| | | |
|---|---|---|
| CN | 1719925 A | 1/2006 |

* cited by examiner

METHOD AND SYSTEM FOR AUTOMATED TESTING OF A GRAPHIC-BASED PROGRAMMING TOOL

BACKGROUND

A graphic-based programming tool is an efficient, effective way for a developer to generate executable code while building screens (i.e., user interfaces) because the tool may be used both to create the screen itself, including its graphical items' layout, and to write the program logic behind the screen concurrently. The screen may thus include its layout and its program logic. Such a tool advantageously saves the developer a great deal of time and effort from coding by hand. Therefore, it is important that the graphic-based programming tool perform correctly so that the developer need not expend unnecessary time and effort redoing incorrectly tool-created screens and/or tool-written program logic. Hence, the tool must be tested prior to use.

However, testing such a graphic-based programming tool generally requires a great deal of effort and complexity. One reason is because the testing must be comprehensive so as to test all the ways that a customer will use the tool in the customer's system. Another reason is that screens can be quite complex with many different screen items, where the tool's handling of each item and its interaction with other items in a screen must be tested. Still another reason is that a screen's program logic may include functions shared with other applications on the system, where the tool's coordination of the screen's flow logic and its interaction with other applications in the system must be tested.

Repetitive testing is also required, such as when debugging the graphic-based programming tool. Also where there are shared functions with other applications, repetitive testing is required when the other applications are modified, such as during a software upgrade. Testing must be done to ensure that the upgrade has not changed the program logic of the built screens. When the graphic-based programming tool itself is upgraded, the upgrades must be tested.

For at least these reasons, manual testing is not a viable option to get meaningful and comprehensive graphic-based programming tool testing results.

One solution has been to provide an automated testing approach. FIG. 1 is a block diagram that depicts such an approach. In this approach, a developer may test a graphic-based programming tool using an automatically generated test script made up of test code and hard-coded data. The test code may define the tool's actions and logic and the hard-coded data may include parameter values used by the test code to execute the tool's actions and logic. For example, in FIG. 1, the graphic-based programming tool is a screen builder, which builds screens and concurrently generates program logic executable when the user interacts with the screen. The developer may first use the tool to build Screen 1, which includes the screen's layout and underlying program logic.

During the screen build, a recorder tool may record the tool's actions and data into a test script, such as Test Script 1, to be replayed later to test the graphic-based programming tool. As mentioned previously, the test script may include the test code and hard-coded data. To test the graphic-based programming tool, the developer runs the test script, which automatically causes the graphic-based programming tool to execute the recorded actions. If the rendered screen or the written program logic is incorrect, then the graphic-based programming tool requires correction and re-testing. An error analysis report, for example, Error Analysis 1, may be generated after the test script finishes, indicating where there were errors in the graphic-based programming tool. The developer may edit the graphic-based programming tool to correct any errors and then repeat the test.

This approach advantageously frees the developer of having to manually test the graphic-based programming tool. Rather, the developer need only execute automatically generated test scripts.

This approach works well for a graphic-based programming tool that is unlikely to be upgraded. This is because the program logic, tool actions, and parameter values of the graphic-based programming tool and/or the built screens are unlikely to change. Hence, the test code and the hard-coded data in the test scripts are unlikely to change as well. Therefore, only minor adjustments need be made to the test scripts when testing the graphic-based programming tool using a test screen. Practically, however, most graphic-based programming tools (and other shared applications) are upgraded over time and would not be very useful if they were not. Therefore, it is unlikely that the program logic, tool actions, and parameter values of the graphic-based programming tool and/or the build screens would remain the same.

However, using the approach of FIG. 1 would be problematic for the more practical system in which graphic-based programming tools (and other shared applications) are upgraded over time. For example, since a test script in this approach includes hard-coded data, the entire script must be re-recorded to test the upgraded tool with upgraded test code and/or data, even if the test screen is essentially unchanged. Similarly, since a particular test script may be limited to a particular test screen, test scripts must be recorded for each screen, even when there are only minor changes between the screens. Also, when a screen item and associated program logic are added, deleted, or otherwise modified, all the affected test scripts must be re-recorded. All of these require a great deal of work to test a graphic-based programming tool.

Accordingly, there is a need in the art for an efficient, effective way to automatically test a graphic-based programming tool.

DETAILED DESCRIPTION

Figure 1:
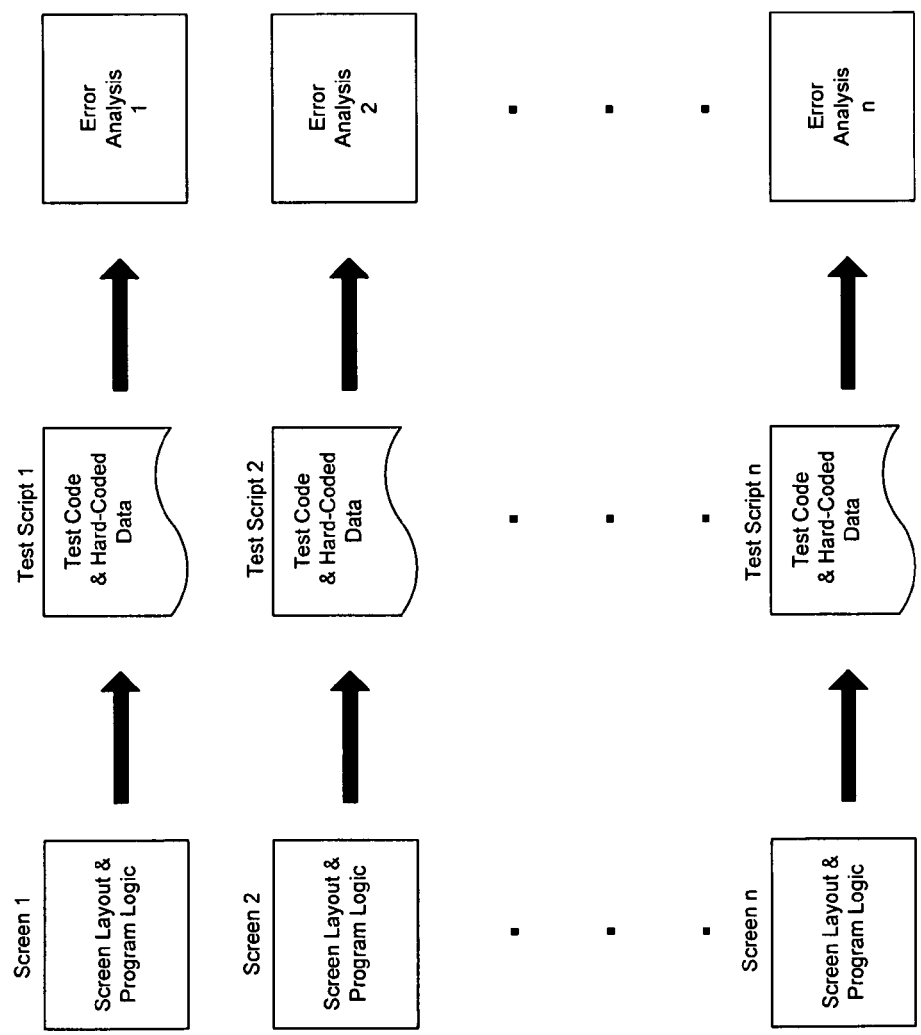
FIG. 1 is a block diagram that depicts a previous approach to automated testing of a graphic-based programming tool.

Embodiments of the present invention include a method and a system for automated testing of a graphic-based programming tool. The method allows a developer to easily generate scripts for automatically testing a graphic-based programming tool using generic reusable building blocks of test code and separate decoupled parameter data. The method further allows the developer to automatically test and re-test a graphic-based programming tool using the generated scripts. The system provides a memory and a processor for implementing the automated testing methods according to embodiments of the present invention. A tool simulator may include a memory and a processor to simulate a graphic-based programming tool in order to automatically test its operation according to embodiments of the present invention.

One graphic-based programming tool application is screen building, in which the graphic-based programming tool may be used to generate executable code while building screens, where a user may thereafter use the built screens to interface with other applications on the system and cause the executable code to run as a result of the user's actions. Screens may be graphical user interfaces, which may include the screen graphical layout and the underlying screen program logic. The screen layout may include a button, a text box, a matrix, a scroll bar, a picture pane, and/or any other graphical item typically found in a screen upon which the user may act in order to provide input to or receive output from another application on the system. The screen program logic may include commands to be executed prior to screen rendering and commands to be executed after the user acts on the screen items. Such commands may include retrieving data from a database, executing another application, etc. The graphic-based programming tool may be used to both create the screen itself and write the program logic concurrently.

While the graphic-based programming tool application described herein is screen building, it is to be understood that embodiments of the present invention may include the graphic-based programming tool used in other applications as well.

A building block according to an embodiment of the present invention may be a discrete block of test code that includes executable commands recognizable by the graphic-based programming tool that, when executed, may cause the tool to build a screen with particular screen items and to write the associated screen program logic. A building block may be generic for several screen items and/or program logic and reused therefor. The test code may include parameter variables to which parameter data values may be dynamically linked during runtime in order to customize the code for particular screen items and program logic. One or more building blocks may make up a test script. The building block size should be large enough to adequately code a discrete function of the tool, such as adding a screen item and its program logic. On the other hand, the building block size should be small enough to be generic and therefore reusable in multiple scripts.

Parameter data may include properties of a screen item that, when linked to a building block of a test script, may cause the tool to build a particular screen item and write its program logic with the properties set forth in the parameter data, such as the item type (e.g., button, box, matrix, pane, etc.), the item position in the screen, the item size dimensions, the item color, the application to be called upon completion of a user's action in the screen, and any other properties typically associated with a screen. Parameter data may be in a file separate from the test script and imported by the test script at runtime. Parameter data may also be decoupled from a particular test script in that the data may be reused for multiple building blocks in different or the same test scripts.

A test script may include a building block for each screen item or screen program logic written for a particular screen and/or screen item. There may be one or more test scripts per screen. To test whether the tool is performing properly, the test script may command the tool to automatically simulate the building of the test screen and/or the writing of its program logic. If the tool properly builds or renders a correct test screen and/or properly writes or executes the program logic, the tool may be deemed to be operating properly. If, however, the tool builds or renders an incorrect test screen, writes or executes the program logic incorrectly, or crashes during script execution, the tool may be deemed to have bugs requiring correction. An error analysis report may indicate what portion of the tool has the bugs.

Figure 2:
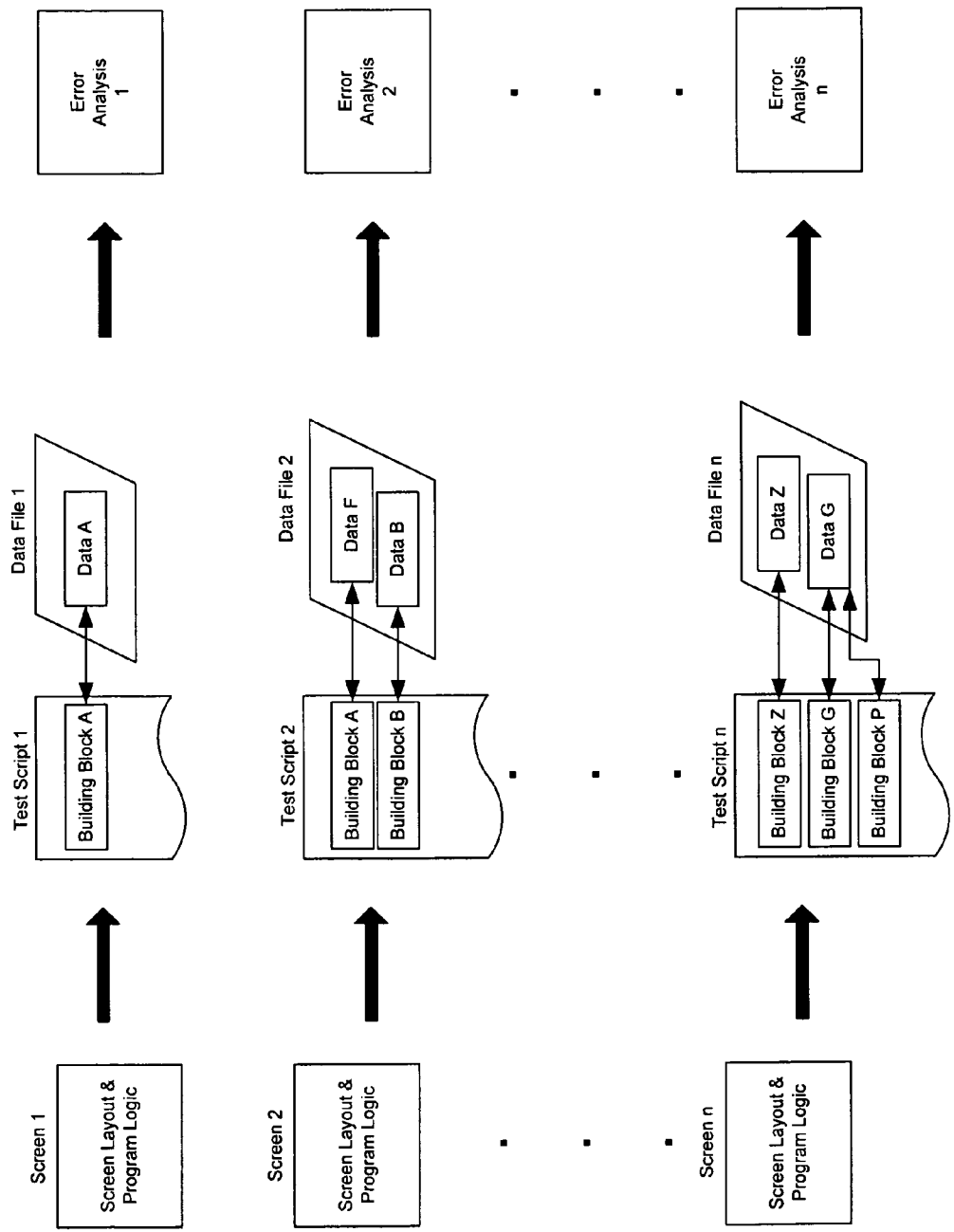
FIG. 2 is a block diagram that depicts a new approach to automated testing of a graphic-based programming tool in accordance with an embodiment of the present invention.

FIG. 2 is a block diagram that depicts a new approach to automated testing of a graphic-based programming tool in accordance with embodiments of the present invention. In this approach, a developer may test a graphic-based programming tool using an automatically generated test script made up of discrete reusable building blocks of test code and an automatically generated parameter data file made up of parameter data values linked during runtime to corresponding parameter variables in the test script. The graphic-based programming tool need not use the recorder tool to generate the test scripts and parameter data files. Rather, the graphic-based programming tool may select, from among a plurality of building blocks of test code, those building blocks corresponding to selected screen items and program logic to place in the test script. The graphic-based programming tool may concurrently place the parameter data values of the selected screen items and program logic into the parameter data file. Since the building blocks are generic, they may be reused in multiple test scripts with different parameter data values to generate the intended screen item and program logic. Conversely, the same parameter data values may be linked to different building blocks in the same or multiple scripts.

For example, Test Script 1 in FIG. 2 includes Building Block A linked to Data A in Data File 1. Test Script 2 also includes Building Block A, but linked to Data F in Data File 2. As such, the program logic and/or screen item generated by Building Block A in Test Script 1 may not be the same as those generated by Building Block A in Test Script 2. Test Script 2 includes a second Building Block B linked to Data B in Data File 2. As such, the screen generated therefrom may include program logic and two screen items, for example. Test Script n in FIG. 2 includes three Building Blocks Z, G, and P. In this script, Data G in Data File 3 may be linked to both Building Blocks G and P. As such, portions of the program logic and/or screen items, though different in Building Blocks G and P, may have the same parameter values.

During test script execution, the script may import linked data values to create the screen items and write the program logic. Built or rendered items and written or executed logic may be indicative of whether the tool has correctly built the screen for rendering and correctly written the underlying program logic. Error analysis may be reviewed by the developer in Error Analysis 1.

This approach is very flexible because it allows the developer to selectively reuse building blocks when generating test scripts and to modify data values without having to re-generate entire test scripts. For example, if the graphic-based programming tool is upgraded, the developer need only replace the upgraded building blocks in the test scripts and the corresponding data in the data files without having to re-generate the entire test scripts and/or data files. Similarly, if the tool has an error discovered through testing, the developer need only correct the erroneous building blocks and/or data. Repetitive testing becomes easier because the same test script may be re-executed with a new parameter data file.

In addition to the above-described uses of building blocks, test script building blocks may be used to test other aspects of the graphic-based programming tool. For example, building blocks may be used in test scripts to set or check screen item properties, such as ensuring that the item has the correct properties and/or program logic, does not overlap another item in the screen, or does not call the incorrect application. Building blocks may also be used in test scripts to test tool hot keys. These building blocks may be particularly useful because hot keys generally can be unstable, requiring a great deal of testing. Building blocks may further be used in test scripts to preview screens. And, of course, building blocks may be used in test scripts for any other aspects of the graphic-based programming tool that do not necessarily fit into a particular category.

Figure 3:
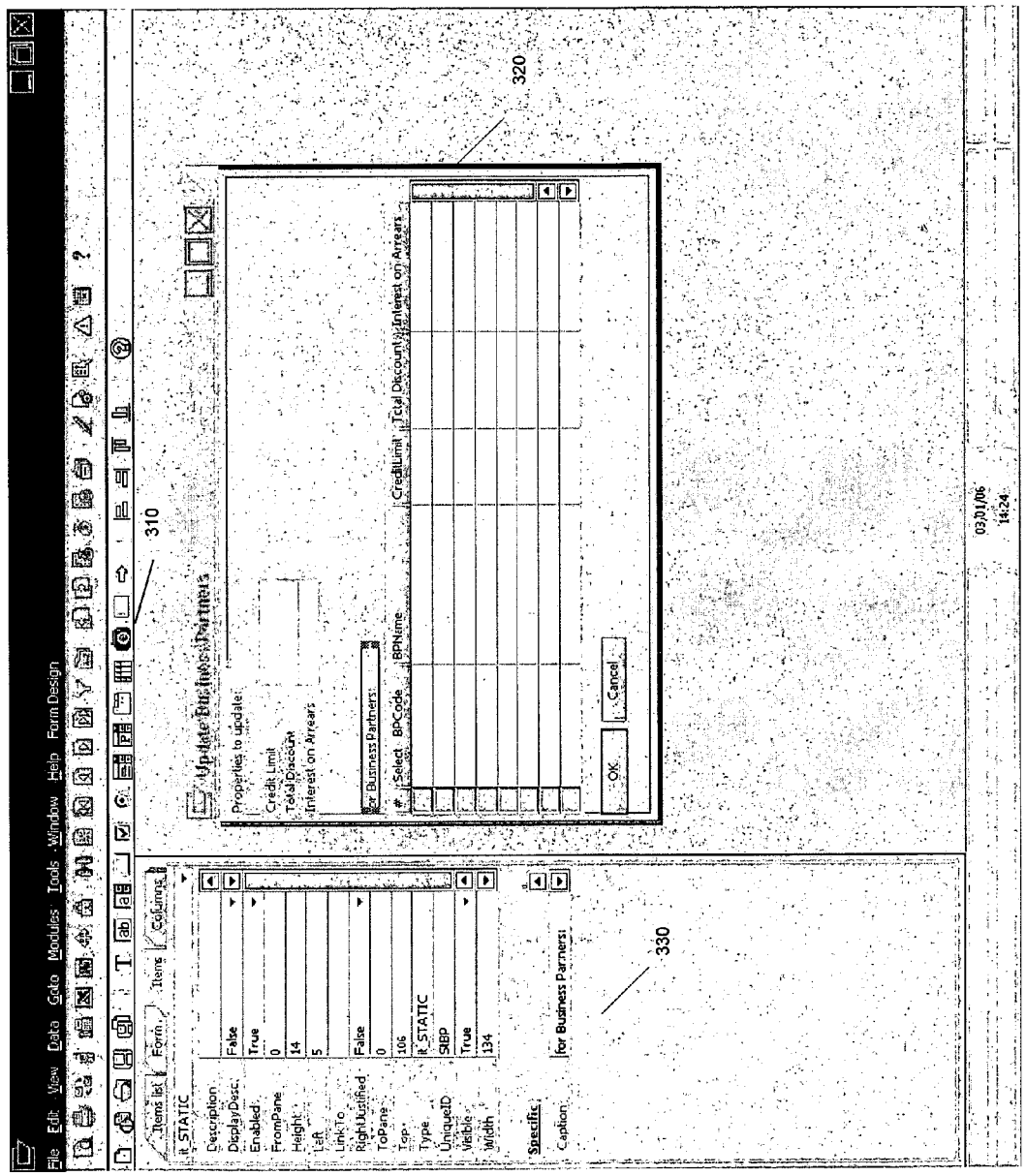
FIG. 3 is a screenshot illustrating a graphic-based programming tool in accordance with an embodiment of the present invention.

FIG. 3 is a screenshot that illustrates an example graphic-based programming tool in accordance with an embodiment of the present invention. A developer may use this tool to build a test screen with program logic and generate the test scripts and parameter data thereof. The tool may include a tool bar 310, a user design form 320, and a properties panel 330, which are described below.

It is to be understood that the FIG. 3 graphic-based programming tool is for illustration purposes, as the tool may include any functionality capable of performing an embodiment of the present invention.

The tool bar 310 may include icons of the screen items that the developer may include in the screen. For example, the icons in FIG. 3 include a check button, a radio button, a text box with scroll bars, a picture pane, and so on. The developer may click on a desired icon and drag it to a position on the user design form 320, which is where it will appear in the rendered screen. Concurrently, the tool may write program logic associated with the desired icon. As the dragging completes, the tool may place the building block for that screen item and its program logic into the test script for this screen.

The screen item may have parameter data values to link with the corresponding building block in the test script. A properties panel 330 may list the parameters for that screen item, its program logic, and parameter default values. Some of the values may be fixed by the graphic-based programming tool; while others may be changed by the developer. The developer may input new values into the changeable fields of the properties panel 330. The tool may place the parameter data values into a parameter data file and link this data file to the test script for this screen.

FIG. 3 shows an "Update Business Partner" screen to be used with its underlying program logic (not shown) to test the graphic-based programming tool. This screen includes, in the user design form 320, several edit box items, labeled "Credit Limit," "Total Discount," and "Interest on Arrears," a static text box item, labeled "for Business Partners," a matrix item with several column headings, and action buttons, labeled "OK" and "Cancel."

This figure illustrates that the developer is currently building the static text box, labeled "for Business Partners." The developer has dragged an icon for the static text box into position on the design form 320. The graphic-based programming tool has placed the building block code for a text box into the test script for this screen. Since this is a static text box, there is no program logic associated with it because the user does not act on this box. Instead, program logic is associated with the screen itself and with actionable screen items, such as action buttons, which may execute another application when the user acts on the item. Prior to adding the text box building block code, the test script will already contain the building block code for the edit boxes, the matrix, and the action buttons. The properties panel 330 shows the parameters for a text box and the default values thereof. The developer may change the values in the properties panel 330. After which, the values will be written to the parameter data file, which already contains the parameter data values for the edit boxes, the matrix, and the action buttons.

After completing this "Update Business Partners" screen, the developer may run the test script, which imports the corresponding parameter data values, to test whether the graphic-based programming tool has performed properly to build the screen and write the program logic.

Figure 4:
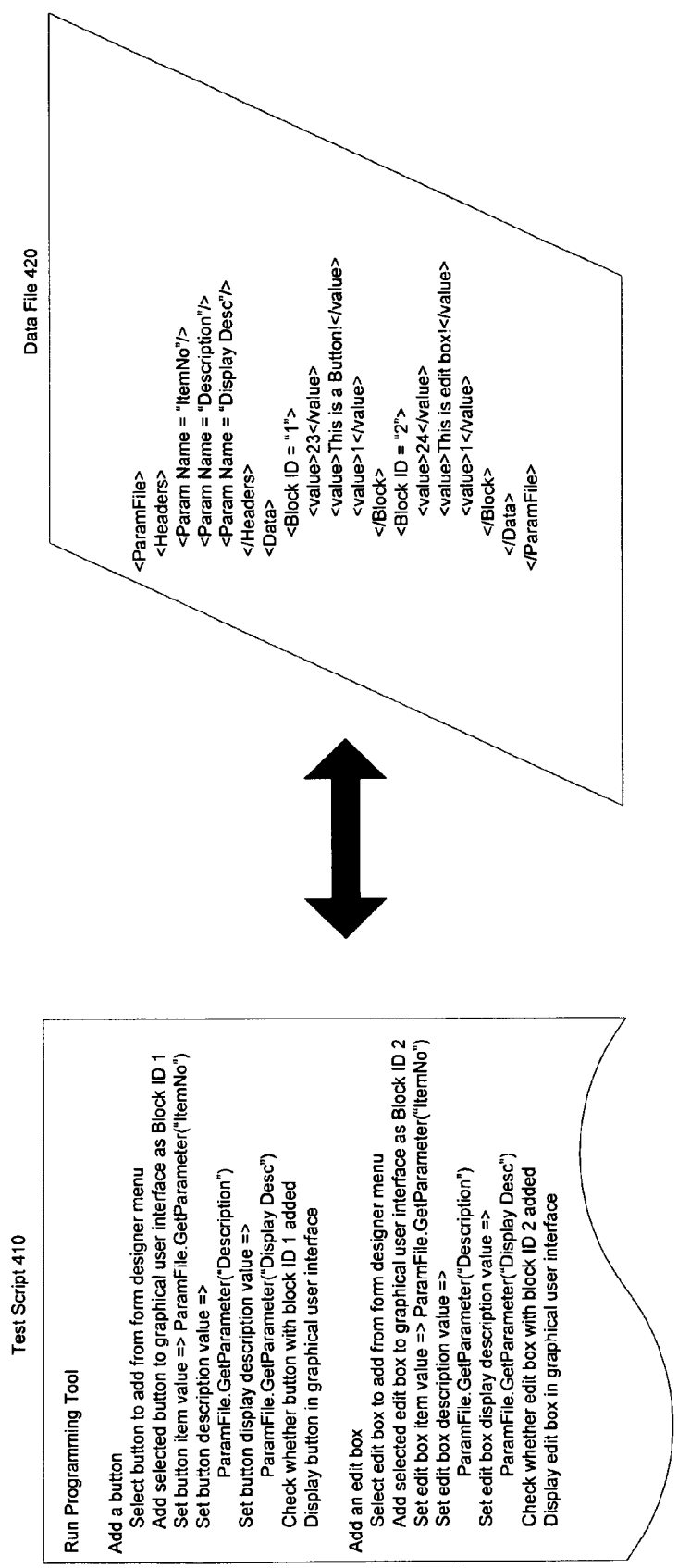
FIG. 4 is an example of a test script file and a parameter data file generated for automated testing of a graphic-based programming tool in accordance with an embodiment of the present invention.

FIG. 4 is an example of a test script file and a parameter data file generated for automated testing of a graphic-based programming tool in accordance with an embodiment of the present invention. In this example, the developer tests whether the graphic-based programming tool has accurately created the screen itself, i.e., a screen with a button and an edit box.

In FIG. 4, the test script 410 may include building blocks which include the tool's actions to add the button and then the edit box to the screen. For example, the "Add a button" building block is placed in the script 410 when the developer uses the tool to add the button to the screen. Similarly, the "Add an edit box" building block is placed in the script 410 when the developer uses the tool to add the edit box to the screen.

In this embodiment, the test script includes only the screen layout building block code. In an alternate embodiment, the test script may include only the program logic building block code, i.e., what happens when the user clicks on the button or writes in the edit box. In another alternate embodiment, the test script may include building block code for both the screen layout and the underlying program logic.

The data file 420 may include the data input by the developer into the tool to be used by the building blocks. For example, the data in Block ID 1 includes data values for the button. The data in Block ID 2 includes data values for the edit box. In this example, the data file is in XML format. However, it is to be understood that any format capable of linking to the test script may be used.

The script 410 may include references to the corresponding data values in the data file 420. In this example, the button has three parameters, "ItemNo," "Description," and "Display Desc." The data in Block ID 1 similarly has three values corresponding to these parameters. Therefore, the button building block may import the parameter values from the data file 420 by identifying the data file and using a get-parameter-value function with the parameter name as the function argument. For example, the button building block code in the script to import the button item number is "ParamFile.GetParameter ("ItemNo")." Similar code appears in the script 410 for the remaining parameter data values.

When the developer executes the test script 410, the graphic-based programming tool opens. The building blocks in the test script are then executed by the tool to generate the desired screen items. For example, the tool executes the "Add a button" building block, which includes selecting the button from the form designer menu, e.g., the tool bar 310, adding the button to the screen, e.g., the user design form 320, with a designation as "Block ID 1," and setting the button parameter values, e.g., the properties panel 330, by importing them from the linked parameter data file. In any alternate embodiment, the parameter file may also include other applications to be executed by the screen program logic. The tool may then perform the error analysis portion of the script 410, where the tool checks whether the button information was added to the screen file and then displays the button in the screen. If the button displays properly, the tool performed correctly for adding a button. In another embodiment, if the program logic executes properly, the tool performed correctly in adding the program logic for the button.

Similarly, the tool may execute the "Add an edit box" building block and determine whether the tool operates properly.

Figure 5:
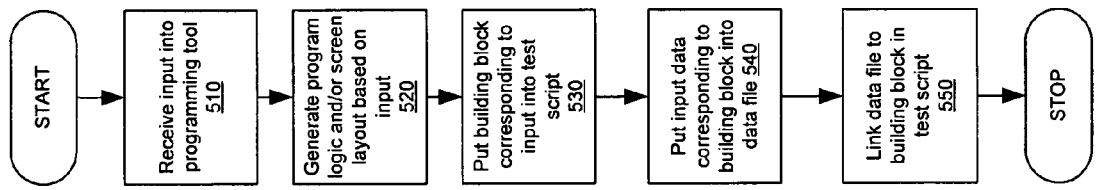
FIG. 5 is a flowchart of a method for generating a script for automated testing of a graphic-based programming tool in accordance with an embodiment of the present invention.

FIG. 5 is a flowchart of a method for generating a test script file and a parameter data file in accordance with an embodiment of the present invention. The graphic-based programming tool may receive (510) and parse input from a developer. The input may include selection of a screen item, selection of screen item properties, a command to begin a new screen, selection of an application that calls the screen, selection of an application that executes from the screen, or any other input associated with screens. The tool may generate (520) a screen item and/or underlying program logic based on the parsed input. The tool may put (530) the building block corresponding to the screen item and/or program logic into a test script file. The tool may put (540) parameter data corresponding to the screen item and/or program logic into a parameter data file. The tool may link (550) the test script and the parameter data file by referring to the data file in the test script file "GetParameter" command. The test script is now ready to test the tool.

Figure 6:
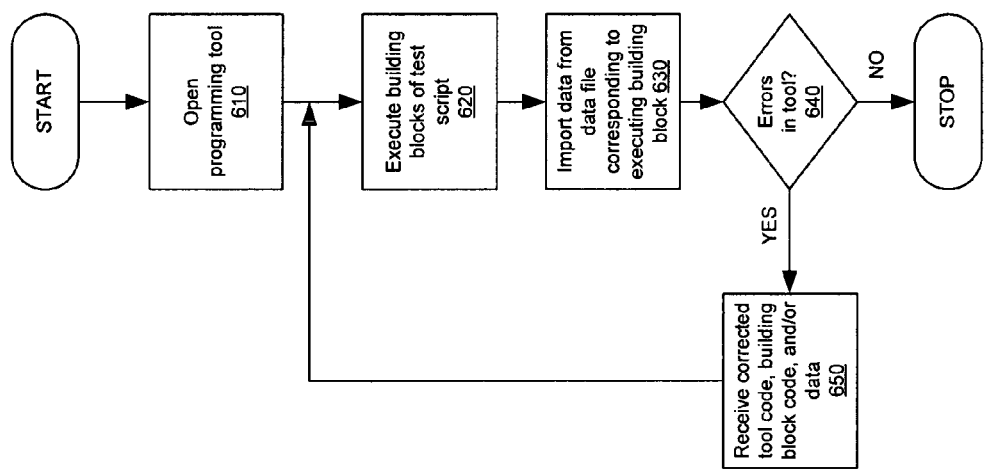
FIG. 6 is a flowchart of a method for automated testing of a graphic-based programming tool in accordance with an embodiment of the present invention.

FIG. 6 is a flowchart of a method for automatically testing a graphic-based programming tool in accordance with an embodiment of the present invention. First, the test script may cause (610) the graphic-based programming tool to run. The graphic-based programming tool may execute (620) the building blocks in the script to build the test screen and/or write the underlying program logic. During execution, the test script may import (630) data from the corresponding parameter data file. The test script may then determine (640) whether there were errors in the addition and/or rendering of the screen items and/or in the addition and/or execution of the underlying program logic. If so, the developer is notified of an error and may correct the graphic-based programming tool code, the building blocks, and/or data. The tool may receive (650) the corrections and repeat the test with the corrected tool and/or the corrected test script and data. If there are no errors in the tool (640), the tool has successfully performed.

The programming tool according to embodiments of the present invention is graphic-based. However, it is to be understood that embodiments of the present invention may be applied to alphanumeric-based, graphic and alphanumeric-based, and any other appropriate programming tool.

Figure 7:
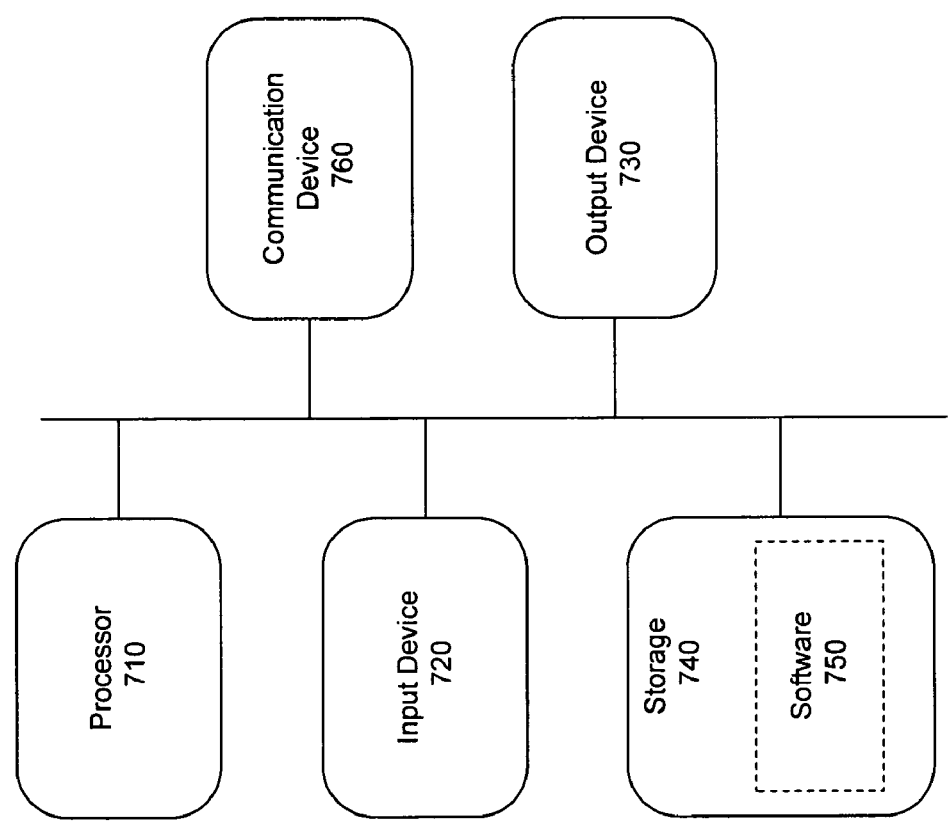
FIG. 7 is a block diagram that depicts a computing device for implementing a method in accordance with an embodiment of the present invention.

FIG. 7 illustrates the components of a basic computing device in accordance with an embodiment of the present invention. The computing device may be a personal computer, workstation, handheld personal digital assistant ("PDA"), or any other type of microprocessor-based device. The computing device may include one or more of processor 710, input device 720, output device 730, storage 740, and communication device 760.

Input device 720 may include a keyboard, mouse, pen-operated touch screen or monitor, voice-recognition device, or any other device that provides input. Output device 730 may include a monitor, printer, disk drive, speakers, or any other device that provides output.

Storage 740 may include volatile and nonvolatile data storage, including one or more electrical, magnetic or optical memories such as a RAM, cache, hard drive, CD-ROM drive, tape drive or removable storage disk. Communication device 760 may include a modem, network interface card, or any other device capable of transmitting and receiving signals over a network. The components of the computing device may be connected via an electrical bus or wirelessly.

Software 750, which may be stored in storage 740 and executed by processor 710, may include, for example, the application programming that embodies the functionality of the present invention.

The network connecting the computer components may include any type of interconnected communication system, which may implement any communications protocol, which may be secured by any security protocol. The corresponding network links may include telephone lines, DSL, cable networks, T1 or T3 lines, wireless network connections, or any other arrangement that implements the transmission and reception of network signals.

The computing device may implement any operating system, such as Windows or UNIX. Software 750 may be written in any programming language, such as ABAP, C, C++, Java or Visual Basic. In various embodiments, application software embodying the functionality of the present invention may be deployed on a standalone machine, in a client/server arrangement or through a Web browser as a Web-based application or Web service, for example.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer-implemented method comprising:
in response to an input to a graphic-based programming tool which is used to build a screen and generate underlying screen program logic concurrently,
automatically placing a block of reusable test code corresponding to the input into a test script file, wherein the block of reusable test code causes the graphic-based programming tool to build the screen or to write the underlying screen program logic, and wherein the test script file includes blocks of reusable test code and commands the graphic-based programming tool to automatically simulate building of the screen or writing of the underlying screen program logic;
automatically placing parameter data corresponding to the input into a data file which is separated from the test script file, wherein the parameter data include properties of an item on the screen that when linked to a block of reusable test code in the test script file, cause the graphic-based programming tool to build the item on the screen or write the underlying screen program logic; and
linking the data file with the test script file to test the input.

2. The method of claim 1, further comprising:
receiving at least one of graphical, textual, logical, or numerical information from a programming tool as the input.

3. The method of claim 1, further comprising:
reusing the block with different parameter data to test the input.

4. The method of claim 1, further comprising:
reusing the parameter data with a different block to test the input.

5. The method of claim 1, wherein the block executes a function represented by the input.

6. The method of claim 1, wherein the data defines the parameters of a function represented by the input.

7. The method of claim 1, further comprising:
parsing the input to determine the block to be placed in the script file and the parameter data to be placed in the data file.

8. A computer-implemented method for testing a programming tool which is used to build a graphical user interface screen and generate underlying screen program logic concurrently, comprising:
automatically placing reusable blocks of test code corresponding to an input into a test script, wherein the reusable blocks of test code cause the programming tool to build the screen or to write the underlying screen program logic;
automatically placing parameter data corresponding to the input into a data file, which is separated from the test script, wherein the parameter data include properties of an item on the screen that when linked to a reusable block of test code in the test script, cause the programming tool to build the item on the screen or write the underlying screen program logic;
importing the parameter data in the data file into the test script comprising reusable blocks of test code;
executing the reusable blocks using the imported parameter data to build the graphical user interface screen and generate program logic underlying the screen using the programming tool; and
analyzing the built screen and the generated program logic to determine whether the programming tool properly built the screen and generated the program logic.

9. The method of claim 8, wherein the importing comprises:
retrieving from a data file the parameter data corresponding to the blocks.

10. The method of claim 8, wherein the importing comprises:
identifying variables in a data file corresponding to variables in the blocks; and
retrieving, from the data file, values of the data file variables.

11. The method of claim 8, further comprising:
determining whether the graphical user interface builder contains errors.

12. The method of claim 8, further comprising:
replacing erroneous parameter data if the programming tool includes a data error;
replacing erroneous blocks if the programming tool includes a graphical error or a logical error;
replacing erroneous executable code of the programming tool if the programming tool includes an execution error; and
re-executing the script with at least one of the replacement data, the replacement blocks, or the replacement executable code to test the programming tool.

13. A system for testing a programming tool which is used to build a graphical user interface and generate underlying interface program logic concurrently, comprising:
a memory for storing blocks of test code and test data; and
a processor in communication with the memory to
generate a plurality of test scripts each comprising a plurality of blocks of reusable test code to test graphical user interface functions, wherein a block of reusable test code causes the programming tool to build the graphical user interface or to write the underlying interface program logic, and wherein the test script commands the programming tool to automatically simulate building of the graphical user interface or writing of the underlying interface program logic, and
generate parameter data files comprising parameter data to be used by the blocks to perform the graphical user interface functions, wherein the parameter data files are separated from the test scripts, wherein the parameter data include properties of an item on the graphical user interface that when linked to a block of reusable test code in a test script, cause the programming tool to build the item on the graphical user interface or write the underlying interface program logic,
wherein the blocks are interchangeably used in the test scripts.

14. The system of claim 13, wherein the processor is to use different parameter data with a same block to re-test a graphical user interface function.

15. The system of claim 13, wherein the processor is to execute the test scripts to determine whether the graphical user interface functions have errors.

16. A simulator for testing a programming tool, comprising:
a memory for storing blocks of automatically generated reusable test code as a test script and test data as a data file, wherein a block of reusable test code causes the programming tool to build a screen or to write underlying screen program logic, wherein the test script commands the programming tool to automatically simulate building of the screen or writing of the underlying screen program logic; wherein the data file is separated from the test script, and wherein the test data include properties of an item on the screen that when linked to a block of reusable test code in the test script, cause the programming tool to build the item on the screen or write the underlying screen program logic; and
a processor in communication with the memory to
link the test data with the test code, and
execute the test code with the linked test data to simulate a programming tool.

17. The simulator of claim 16, wherein the processor is to link the test data with the test code at runtime.

18. The simulator of claim 16, wherein the processor is to execute the test code with the linked test data to simulate creation of a graphical user interface screen with the programming tool.

19. The simulator of claim 16, wherein the processor is to execute the test code with the linked test data to simulate creation of program logic underlying a graphical user interface screen with the programming tool.

20. The simulator of claim 16, wherein the processor is to execute the test code with the linked test data to simulate execution of program logic underlying a graphical user interface screen with the programming tool.

* * * * *